United States Patent
Uchida (10) Patent No.: US 9,873,424 B2
(45) Date of Patent: Jan. 23, 2018

(54) HYBRID VEHICLE

(71) Applicant: Toyota Jidosha Kabushiki Kaisha, Toyota-shi Aichi-ken (JP)

(72) Inventor: Kenji Uchida, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 2 days.

(21) Appl. No.: 15/252,600

(22) Filed: Aug. 31, 2016

(65) Prior Publication Data

US 2017/0072946 A1    Mar. 16, 2017

(30) Foreign Application Priority Data

Sep. 10, 2015 (JP) ................. 2015-178322

(51) Int. Cl.

| | |
|---|---|
| B60W 20/00 | (2016.01) |
| B60W 20/50 | (2016.01) |
| B60K 6/365 | (2007.10) |
| B60W 10/08 | (2006.01) |
| B60W 10/10 | (2012.01) |
| B60W 10/06 | (2006.01) |
| B60K 6/445 | (2007.10) |
| F16H 3/72 | (2006.01) |
| B60K 6/26 | (2007.10) |
| B60K 6/383 | (2007.10) |
| B60K 6/387 | (2007.10) |
| B60K 6/547 | (2007.10) |

(Continued)

(52) U.S. Cl.
CPC ............ *B60W 20/50* (2013.01); *B60K 6/365* (2013.01); *B60K 6/445* (2013.01); *B60W 10/06* (2013.01); *B60W 10/08* (2013.01); *B60W 10/10* (2013.01); *F16H 3/727* (2013.01); *B60K 6/383* (2013.01); *B60K 6/387* (2013.01); *B60K 6/547* (2013.01); *B60K 2006/268* (2013.01); *B60K 2006/381* (2013.01); *B60W 20/30* (2013.01); *B60W 2510/08* (2013.01); *B60W 2710/081* (2013.01); *B60W 2710/1005* (2013.01); *B60Y 2200/92* (2013.01); *B60Y 2306/13* (2013.01); *F16H 3/66* (2013.01); *F16H 2003/445* (2013.01); *F16H 2200/0043* (2013.01); *F16H 2200/2007* (2013.01); *F16H 2200/2041* (2013.01); *F16H 2200/2066* (2013.01); *F16H 2200/2082* (2013.01); *Y02T 10/6239* (2013.01); *Y02T 10/6286* (2013.01); *Y10S 903/93* (2013.01); *Y10S 903/945* (2013.01)

(58) Field of Classification Search
None
See application file for complete search history.

(56) References Cited

U.S. PATENT DOCUMENTS

2007/0249461 A1* 10/2007 Tsuji ..................... B60K 1/02
477/3
2015/0217762 A1* 8/2015 Cao ..................... B60K 6/445
477/4

FOREIGN PATENT DOCUMENTS

JP    2010-012907 A    1/2010

* cited by examiner

*Primary Examiner* — Jonathan M Dager
*Assistant Examiner* — Garrett F Evans
(74) *Attorney, Agent, or Firm* — Dinsmore & Shohl LLP

(57) ABSTRACT

When an engine is in a stopped state and a rotation speed of a first rotating electric machine is not within a range in which the engine can be started by a drag torque generated by three-phase-short-circuit control, an electronic control unit performs transmission control of an automatic transmission such that the rotation speed of the first rotating electric machine falls within the range.

2 Claims, 11 Drawing Sheets (51) Int. Cl.
*F16H 3/66* (2006.01)
*B60K 6/38* (2007.10)
*B60W 20/30* (2016.01)
*F16H 3/44* (2006.01)

|     | CL1 | CL2 | B1 | B2  | F1 |
|-----|-----|-----|----|-----|----|
| 1st | Y   |     |    | (Y) | Y  |
| 2nd | Y   |     | Y  |     |    |
| 3rd | Y   | Y   |    |     |    |
| 4th |     | Y   | Y  |     |    |
| R   | Y   |     |    | Y   |    |
| N   |     |     |    |     |    |

Y : ENGAGED
(Y): ENGAGED DURING ENGINE BRAKING

HYBRID VEHICLE

CROSS-REFERENCE TO RELATED APPLICATIONS

This nonprovisional application claims priority to Japanese Patent Application No. 2015-178322 filed on Sep. 10, 2015, with the Japan Patent Office, the entire contents of which are hereby incorporated by reference.

BACKGROUND

Field

The present disclosure relates to hybrid vehicles, and more particularly to control when a short-circuit fault occurs in a switching element forming an inverter which drives a motor generator in a hybrid vehicle.

Description of the Background Art

A configuration of a hybrid vehicle, which includes an engine, a first motor generator having a three-phase alternating-current (AC) motor, a second motor generator configured to rotate in synchronization with the drive shaft of the wheels, and a planetary gear mechanism, is known. The planetary gear mechanism includes a sun gear coupled to the first motor generator, a ring gear coupled to the second motor generator, and a carrier coupled to the engine.

An inverter which drives the first motor generator includes drive arms of three phases. Each of these drive arms has a switching element forming an upper arm and a switching element forming a lower arm.

In such a hybrid vehicle, when a short-circuit fault occurs in a switching element forming the inverter which drives the first motor generator, an excessive short-circuit current may flow through the short-circuit section. Therefore, there is a need to take appropriate measures in order to prevent damage to devices.

For example, Japanese Patent Laying-Open No. 2010-12907 discloses control in which when a short-circuit fault occurs in one phase or two phases of an inverter which drives a first motor generator, the remaining phase(s) are also short-circuited to place the driving inverter in a three-phase-short-circuit state. Accordingly, a short-circuit current is distributed across a plurality of paths, thereby suppressing excessive heat generation in the driving inverter and its peripheral devices.

SUMMARY

In a hybrid vehicle having the configuration as described above, when a short-circuit fault occurs in one phase of the inverter which drives the first motor generator, a limp-home run is performed by controlling the driving inverter to place the inverter in the three-phase-short-circuit state. When the driving inverter is controlled to be placed in the three-phase-short-circuit state, a torque (braking torque) is generated in a direction which stops the rotation of the first motor generator, due to a counter electromotive force produced when the first motor generator is driven to rotate. This torque is also referred to as a "drag torque."

If the aforementioned limp-home run is implemented as a run using the second motor generator with the engine in a stopped state (a so-called motor run), the first motor generator rotates in a negative direction. Rotation speed of the first motor generator at this time varies in a positive direction (a direction toward zero) due to the drag torque. Consequently, the engine is driven to rotate in a positive direction to increase the engine speed. If the engine in a stopped state can be started, for example, by increasing the engine speed, the limp-home capability can be improved.

In the hybrid vehicle described above, rotation speed of the second motor generator is determined according to vehicle speed. Thus, when the engine speed is substantially constant (for example, when the engine is in a stopped state), rotation speed of the first motor generator is also determined according to the vehicle speed. Generally, the magnitude of a drag torque depends on the rotation speed of a first motor generator. Thus, the magnitude of a drag torque is determined according to vehicle speed. Therefore, a desired drag torque may not be secured depending on the vehicle speed, resulting in inability to increase engine speed appropriately. As a result, when the engine is in a stopped state, for example, it may be impossible to increase the engine speed to a speed at which the engine can be started.

Some embodiments described herein provide a technique allowing engine speed to be increased appropriately when an inverter which drives a first motor generator is controlled to be placed in a three-phase-short-circuit state in a hybrid vehicle.

A hybrid vehicle according to one aspect of the present disclosure includes an engine; a first rotating electric machine including a three-phase AC motor; a second rotating electric machine configured to output motive power to a drive shaft; a planetary gear mechanism; an inverter; a transmission; and a controller configured to control the inverter and the transmission. The planetary gear mechanism includes a sun gear coupled to the first rotating electric machine, a ring gear coupled to the second rotating electric machine, and a carrier coupled to the engine. The inverter includes drive arms of three phases each having an upper arm and a lower arm, and is configured to drive the first rotating electric machine. The transmission includes a plurality of gear positions, and is coupled between the second rotating electric machine and the drive shaft. The controller is configured to, when the engine is stopped and a short-circuit fault occurs in one of the upper arm and the lower arm of one phase of the drive arms of three phases, perform three-phase-short-circuit control in which the upper arms or the lower arms of the phases without the short-circuit fault are short-circuited, on the same side as the upper arm or the lower arm with the short-circuit fault. The controller is configured to, when rotation speed of the first rotating electric machine is not within a specific range in which the engine can be started by a torque generated by the three-phase-short-circuit control, perform transmission control of the transmission such that the rotation speed of the first rotating electric machine falls within the specific range.

According to the configuration described above, the hybrid vehicle is provided with the transmission having the plurality of gear positions. When the gear position of this transmission is changed, the rotation speed of the second motor generator may vary. Consequently, the rotation speed of the first motor generator may also vary. The magnitude of the aforementioned torque (drag torque) depends on the rotation speed of the first motor generator, as mentioned above. In the configuration described above, therefore, the rotation speed of the first motor generator can be controlled by the transmission control of the transmission, thereby controlling the magnitude of the drag torque. Thus, the engine speed can be increased appropriately.

In some embodiments, when performing the transmission control, the controller is configured to calculate a predicted value of the rotation speed of the first rotating electric machine for each of two or more gear positions of the plurality of gear positions, the value predicted when switching is made to the gear position. The controller is configured to select a lower speed gear position of the gear positions at which the predicted values are within the specific range.

On a nomographic chart, an amount of increase in the engine speed is determined not only by the magnitude of the aforementioned torque (in other words, an amount of increase in the rotation speed of the first rotating electric machine), but also by the magnitude of a negative torque which is output from the second rotating electric machine so as to receive a reaction force of the aforementioned torque (in other words, an amount of decrease in the rotation speed of the second rotating electric machine). The lower the speed of the gear position, the higher the rotation speed of the second rotating electric machine, thus the more likely the amount of decrease in the rotation speed of the second rotating electric machine will increase, and therefore, the more likely the amount of increase in the engine speed will increase. According to the configuration described above, therefore, the engine can be started more reliably.

The foregoing and other features, aspects and advantages of the present disclosure will become more apparent from the following detailed description when taken in conjunction with the accompanying drawings.

DETAILED DESCRIPTION

Embodiments of the present disclosure will be described below in detail with reference to the drawings, in which the same or corresponding parts are designated by the same reference characters and description thereof will not be repeated.

<Vehicle Configuration>

Figure 1:
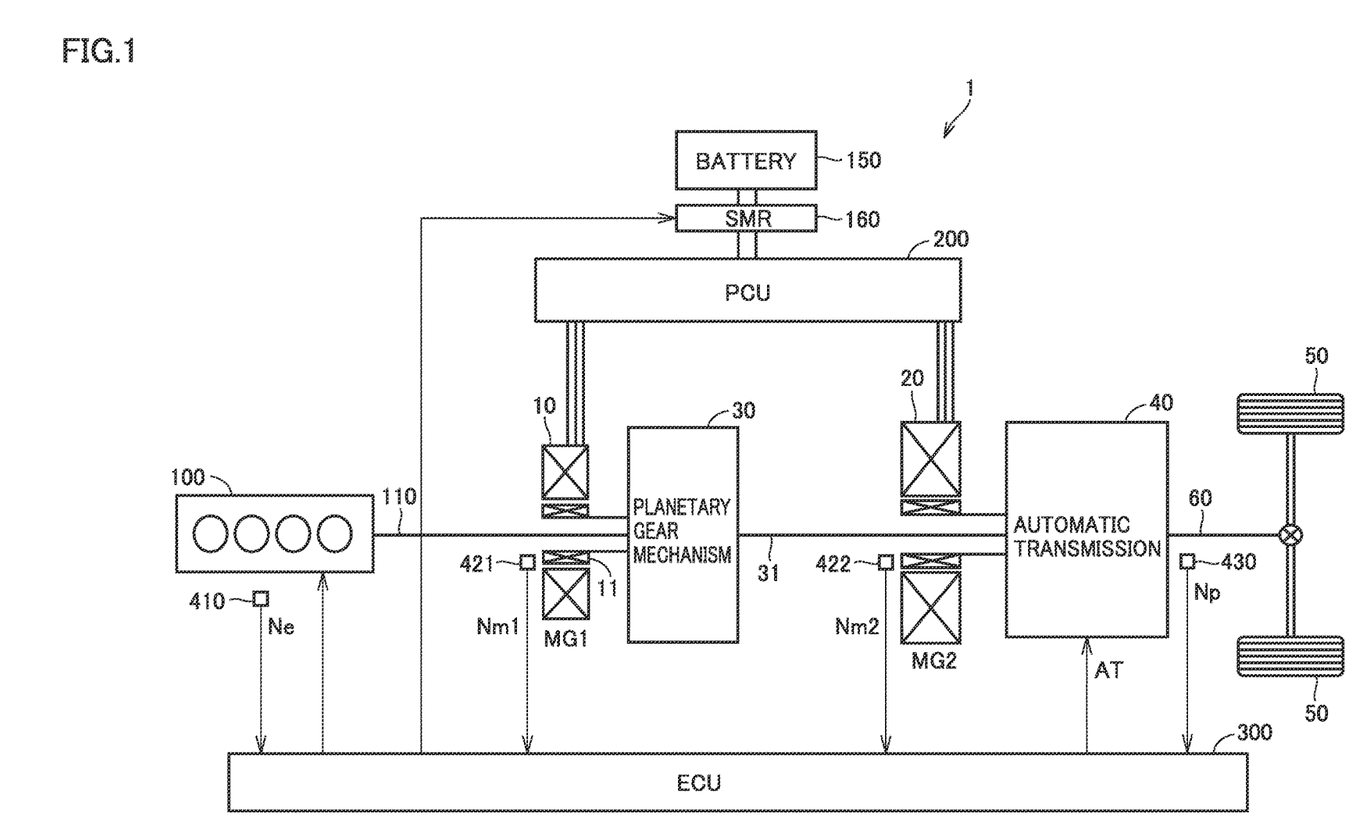
FIG. 1 is a block diagram schematically showing an overall configuration of a hybrid vehicle according to one or more embodiments.

FIG. 1 is a block diagram schematically showing an overall configuration of a hybrid vehicle. With reference to FIG. 1, a vehicle 1 includes an engine 100, motor generators 10, 20, a planetary gear mechanism 30, an automatic transmission 40, wheels 50, a battery 150, a system main relay (SMR) 160, a power control unit (PCU) 200, and an electronic control unit (ECU) 300.

Engine 100 is an internal combustion engine such as a gasoline engine or diesel engine. Engine 100 generates, in response to a control signal from ECU 300, motive power for vehicle 1 to run. The motive power generated by engine 100 is output to planetary gear mechanism 30.

Engine 100 is provided with an engine speed sensor 410. Engine speed sensor 410 detects a speed of engine 100 (engine speed) Ne, and outputs a signal indicating the detection result to ECU 300.

Each of motor generators 10 and 20 is a three-phase AC permanent magnet synchronous motor. When starting engine 100, motor generator (first rotating electric machine) 10 rotates a crankshaft 110 of engine 100 using electric power of battery 150. Motor generator 10 can also generate electric power using the motive power from engine 100. The AC power generated by motor generator 10 is converted to direct-current (DC) power by PCU 200 and charged into battery 150. The AC power generated by motor generator 10 may be supplied to motor generator 20.

Motor generator (second rotating electric machine) 20 rotates an output shaft 31 of planetary gear mechanism 30 using at least one of the electric power supplied from battery 150 and the electric power generated by motor generator 10. Motor generator 20 can also generate electric power by regenerative braking. The AC power generated by motor generator 20 is converted to DC power by PCU 200 and charged into battery 150.

Motor generator 10 is provided with a resolver 421. Resolver 421 detects rotation speed of motor generator 10 (MG1 rotation speed) Nm1, and outputs a signal indicating the detection result to ECU 300. Likewise, motor generator 20 is provided with a resolver 422. Resolver 422 detects rotation speed of motor generator 20 (MG2 rotation speed) Nm2, and outputs a signal indicating the detection result to ECU 300.

Planetary gear mechanism 30 splits the motive power received from engine 100 into motive power to be transmitted to motor generator 10, and motive power to be transmitted to wheels 50 through motor generator 20 and automatic transmission 40. The configuration of planetary gear mechanism 30 will be described in detail with reference to FIG. 2.

Automatic transmission 40 is a gear type transmission having a plurality of gear positions (four positions in some embodiments). Automatic transmission 40 switches among the gear positions in response to a transmission instruction AT from ECU 300. An input shaft 43 of automatic transmission 40 is coupled to motor generator 20, and is coupled to engine 100 and motor generator 10 through planetary gear mechanism 30. An output shaft 44 of automatic transmission 40 is coupled to a propeller shaft 60.

Propeller shaft (drive shaft) 60 rotates with at least one of the motive power transmitted from engine 100 through planetary gear mechanism 30 and automatic transmission 40, and motive power transmitted from motor generator 20 through automatic transmission 40.

Propeller shaft 60 is provided with a vehicle speed sensor 430. Vehicle speed sensor 430 detects a rotation speed of propeller shaft 60 (propeller shaft rotation speed) Np, and outputs a signal indicating the detection result to ECU 300.

ECU 300 calculates vehicle speed V based on the signal from vehicle speed sensor 430.

Battery 150 is a rechargeable power storage device. Battery 150 includes a secondary battery, a typical example of which is a nickel-metal hydride battery or a lithium-ion secondary battery, or includes a capacitor such as an electric double layer capacitor.

SMR 160 is connected in series with a power line between battery 150 and PCU 200. SMR 160 switches between a conducting state and a cutoff state between battery 150 and PCU 200 in response to a control signal from ECU 300.

PCU 200 boosts the DC power stored in battery 150, converts the boosted voltage to AC voltage, and supplies the voltage to motor generator 10 and motor generator 20. PCU 200 also converts the AC power generated by motor generator 10 and motor generator 20 to DC power, and supplies the power to battery 150. The configuration of PCU 200 will be described in detail with reference to FIG. 4.

ECU (controller) 300 includes, although not shown, a CPU (central processing unit), a memory, an input/output buffer, and the like. Based on signals from the sensors and devices, as well as a map and program stored in the memory, ECU 300 control various devices such that vehicle 1 enters a desired running state. The various types of control are not limited to be processed by software, but may be processed by dedicated hardware (electronic circuit).

Figure 2:
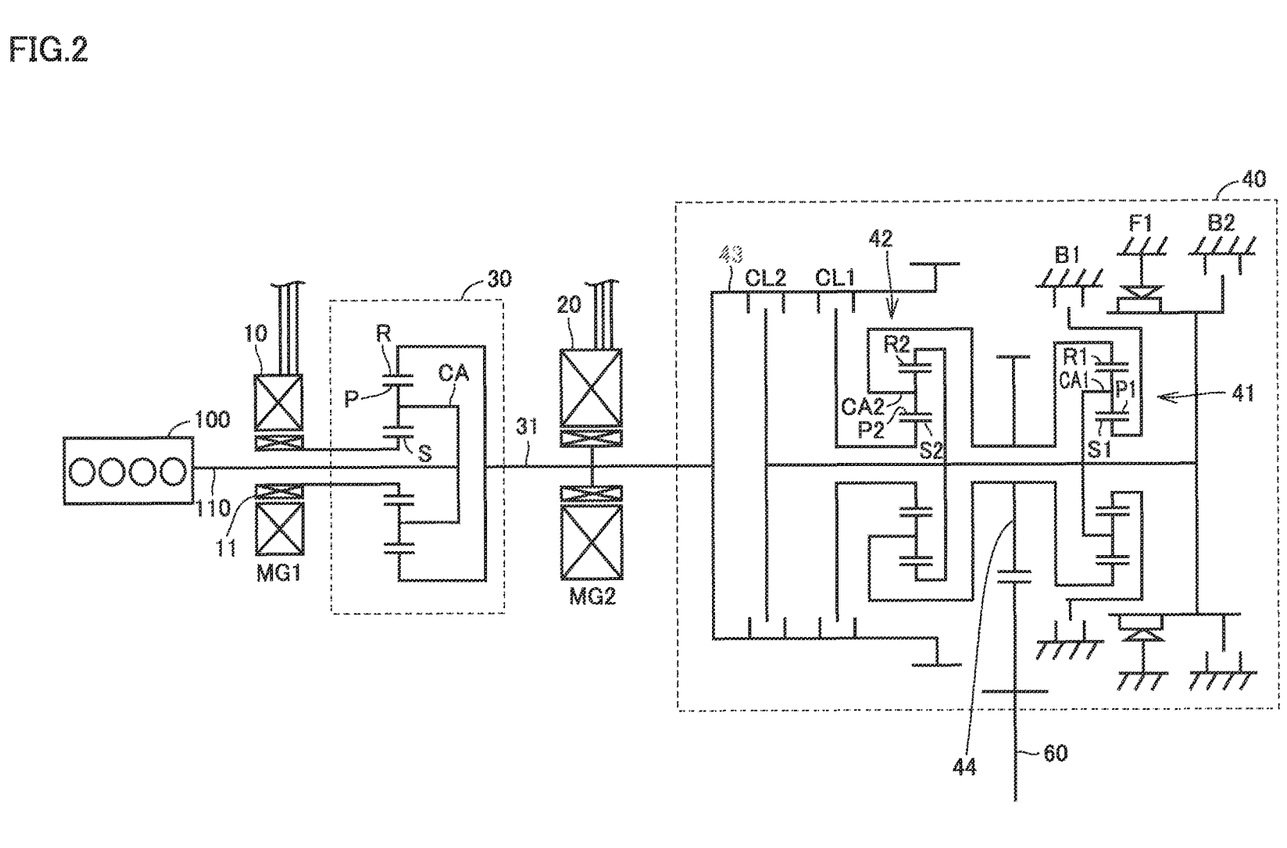
FIG. 2 is a diagram showing in more detail the configuration of a planetary gear mechanism and an automatic transmission.

FIG. 2 is a diagram representing in more detail the configuration of planetary gear mechanism 30 and automatic transmission 40. With reference to FIGS. 1 and 2, planetary gear mechanism 30 includes a sun gear S, a ring gear R, a carrier CA, and a pinion gear P.

Sun gear S is coupled to a rotor 11 of motor generator 10. Ring gear R is coupled to output shaft 31 of planetary gear mechanism 30. Pinion gear P meshes with sun gear S and ring gear R. Carrier CA holds pinion gear P such that pinion gear P can rotate and revolve, and is coupled to crankshaft 110 of engine 100.

Automatic transmission 40 includes single pinion type planetary gears 41, 42, and a one-way clutch F1. Planetary gear 41 has a sun gear S1, a ring gear R1, a pinion gear P1 which meshes with sun gear S1 and ring gear R1, and a carrier CA1 which holds pinion gear P1 such that pinion gear P1 can rotate and revolve. The configuration of planetary gear 42 is equivalent to that of planetary gear 41, and thus description thereof will not be repeated. One-way clutch F1 supports carrier CA1 and ring gear R2 such that carrier CA1 and ring gear R2 can rotate in one direction and cannot rotate in the other direction.

Automatic transmission 40 further includes brakes B1, B2 and clutches CL1, CL2. Brake B1 selectively fixes sun gear S1. Brake B2 selectively fixes carrier CA1 and ring gear R2. When brake B1 and clutch CL1 are both engaged, a sun gear S2 is coupled to ring gear R of planetary gear mechanism 30. When clutch CL2 is engaged, carrier CA1 and ring gear R2 coupled to each other are both coupled to ring gear R of planetary gear mechanism 30.

In this manner, automatic transmission 40 is switched among an engaged state, a semi-engaged state and a disengaged state due to change in engaged state of each element. In the engaged state of automatic transmission 40, the entire torque is transmitted between input shaft 43 and output shaft 44 of automatic transmission 40. In the semi-engaged state, part of the torque is transmitted between input shaft 43 and output shaft 44 of automatic transmission 40. In the disengaged state, the torque transmission is interrupted between input shaft 43 and output shaft 44 of automatic transmission 40.

Figure 3:
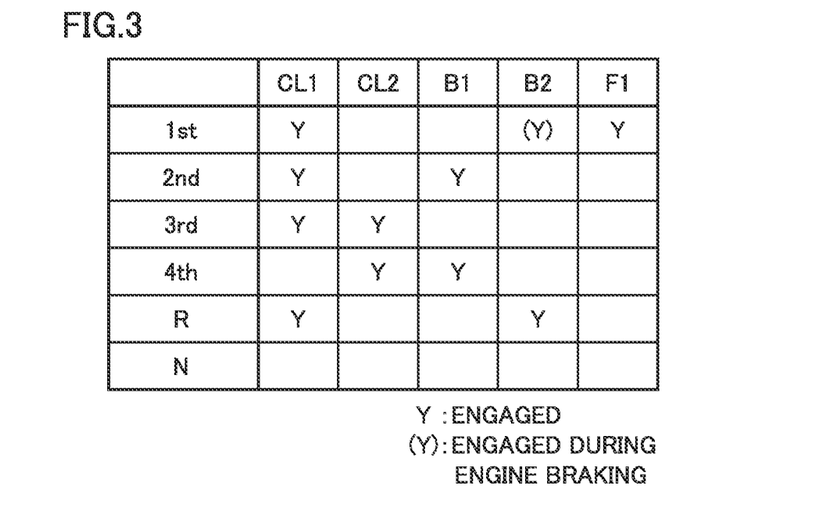
FIG. 3 is a diagram showing a table of engagement operation of the automatic transmission.

FIG. 3 is a diagram showing a table of engagement operation of automatic transmission 40. In FIG. 3, "Y" indicates that the element is in the engaged state, "(Y)" indicates that the element is engaged during engine braking, and a blank space indicates that the element is in the disengaged state.

With reference to FIGS. 2 and 3, in automatic transmission 40, four forward gear positions (indicated as 1st to 4th) and a rearward gear position (indicated as R) are selectively formed by engagement of each element according to the table of engagement operation. Of the forward gear positions, the first gear position has the lowest transmission gear ratio, and the fourth gear position has the highest transmission gear ratio. The transmission gear ratio means a ratio of rotation speed of input shaft 43 of automatic transmission 40 to rotation speed of output shaft 44 of automatic transmission 40. A neutral state (indicated as N) is formed by causing all the elements to be in the disengaged state. The configuration of automatic transmission 40 shown in FIG. 2 and the table of engagement operation shown in FIG. 3 are only exemplary and are not limiting.

<Configuration of Electrical System>

Figure 4:
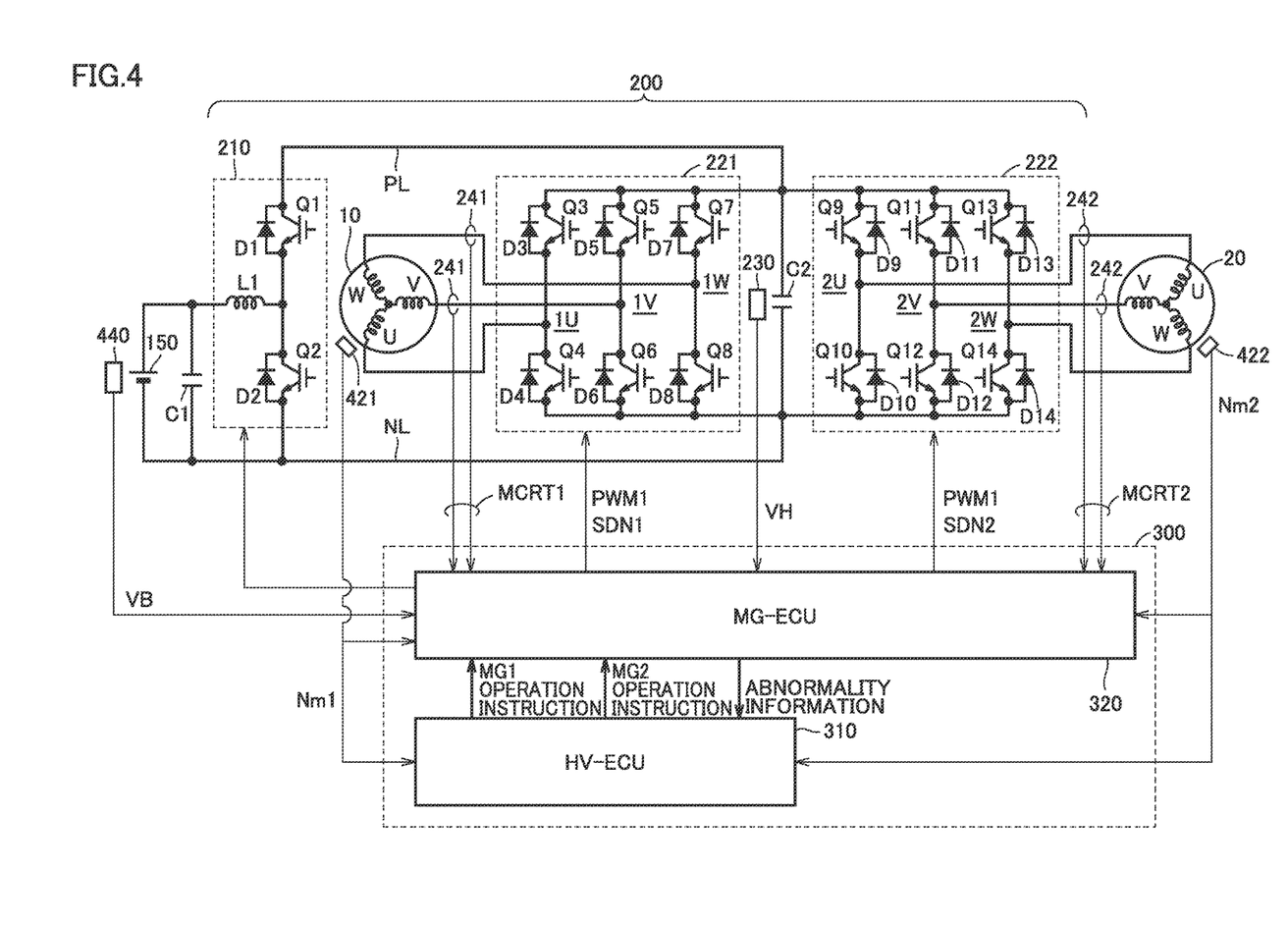
FIG. 4 is a block diagram schematically showing the configuration of an electrical system of the hybrid vehicle.

FIG. 4 is a block diagram schematically showing the configuration of an electrical system of vehicle 1. With reference to FIGS. 1 and 4, PCU 200 includes a capacitor C1, a converter 210, a capacitor C2, inverters 221, 222, a voltage sensor 230, and current sensors 241, 242. ECU 300 includes a HV-ECU 310 and a MG-ECU 320.

Battery 150 is provided with a voltage sensor 440. Voltage sensor 440 detects a voltage VB of battery 150, and outputs a signal indicating the detection result to MG-ECU 320.

Capacitor C1 is connected in parallel with battery 150. Capacitor C1 smoothes voltage VB supplied from battery 150, and supplies the voltage to converter 210.

In response to a control signal from MG-ECU 320, converter 210 boosts voltage VB supplied from battery 150 through capacitor C1, and supplies the voltage to inverters 221, 222. In addition, in response to a control signal from MG-ECU 320, converter 210 steps down a DC voltage supplied from one or both of inverter 221 and inverter 222 through capacitor C2, and charges battery 150.

More specifically, converter 210 includes a reactor L1, switching elements Q1, Q2, and diodes D1, D2. Each of switching elements Q1, Q2 and switching elements Q3 to Q14 which will be described later is, for example, an IGBT (insulated gate bipolar transistor). Switching elements Q1 and Q2 are connected in series with each other between a power line PL and a power line NL. Diodes D1 and D2 are connected in anti-parallel between the collector and emitter of switching elements Q1 and Q2, respectively. Reactor L1 has one end connected to the high-potential side of battery 150. Reactor L1 has the other end connected to a midpoint between switching element Q1 and switching element Q2 (a connection point between the emitter of switching element Q1 and the collector of switching element Q2).

Capacitor C2 is connected between power line PL and power line NL. Capacitor C2 smoothes a DC voltage supplied from converter 210, and supplies the voltage to inverters 221, 222.

Voltage sensor 230 detects a voltage across capacitor C2, that is, an output voltage VH from converter 210, and outputs a signal indicating the detection result to MG-ECU 320.

When output voltage VH from converter 210 is supplied, inverter 221 converts, in response to a control signal from MG-ECU 320, the DC voltage to an AC voltage to drive motor generator 10. Accordingly, motor generator 10 is driven to generate a torque specified by a torque command value TR1.

More specifically, inverter 221 includes a U-phase arm 1U, a V-phase arm 1V, and a W-phase arm 1W. These phase arms are connected in parallel with one another between power line PL and power line NL. U-phase arm 1U has switching elements Q3 and Q4 connected in series with each other. V-phase arm 1V has switching elements Q5 and Q6 connected in series with each other. W-phase arm 1W has switching elements Q7 and Q8 connected in series with each other. Diodes D3 to D8 are connected in anti-parallel between the collector and emitter of switching elements Q3 to Q8, respectively.

The midpoint of each phase arm is connected to each phase coil of motor generator 10. That is, three coils of the U-phase, V-phase and W-phase of motor generator 10 each have one end connected in common to a neutral point. The U-phase coil has the other end connected to a midpoint between switching elements Q3 and Q4. The V-phase coil has the other end connected to a midpoint between switching elements Q5 and Q6. The W-phase coil has the other end connected to a midpoint between switching elements Q7 and Q8. The configuration of inverter 222 is basically equivalent to that of inverter 221, and thus description thereof will not be repeated.

Current sensor 241 detects a current flowing through motor generator 10 (motor current) MCRT1, and outputs a signal indicating the detection result to MG-ECU 320. Current sensor 242 detects a current flowing through motor generator 20 (motor current) MCRT2, and outputs a signal indicating the detection result to MG-ECU 320.

HV-ECU 310 generates operation instructions for motor generators 10, 20 and a voltage command value for converter 210, and outputs them to MG-ECU 320. The operation instructions output from HV-ECU 310 include an operation permission instruction and an operation prohibition instruction (gate cutoff instruction) for each of motor generators 10 and 20, torque command value TR1 for motor generator 10, a torque command value TR2 for motor generator 20, command values for MG1 rotation speed Nm1 and MG2 rotation speed Nm2, and the like.

MG-ECU 320 receives the operation instructions for motor generators 10, 20 and the voltage command value for converter 210 from HV-ECU 310. MG-ECU 320 also receives signals from the sensors. Based on the operation instructions and voltage command value described above as well as the various signals, MG-ECU 320 controls converter 210 such that output voltage VH from converter 210 follows the voltage command value for converter 210.

In addition, MG-ECU 320 controls inverters 221, 222 such that motor generators 10, 20 operate according to the operation instructions received from HV-ECU 310. A typical example of the control of inverter 221 is described. Upon receiving the operation permission instruction for motor generator 10 from HV-ECU 310, MG-ECU 320 generates, based on output voltage VH, motor current MCRT1 and torque command value TR1, a control signal PWM1 of a PWM (pulse width modulation) scheme for switching operation of each of switching elements Q3 to Q8, and outputs the signal to inverter 221. Upon receiving the gate cutoff instruction for motor generator 10 from HV-ECU 310, on the other hand, MG-ECU 320 generates a gate cutoff signal SDN1 for stopping the switching operation of each of switching elements Q3 to Q8, and outputs the signal to inverter 221.

Furthermore, MG-ECU 320 detects an abnormality in motor generators 10, 20. Information about the abnormality detected by MG-ECU 320 is output to HV-ECU 310. HV-ECU 310 is configured to reflect these pieces of abnormality information in the operation instructions for motor generators 10, 20.

<Short-Circuit Fault in Inverter>

In such vehicle 1, during running, a short-circuit fault may occur in which the switching elements remain in a conducting state in inverter 221 which drives motor generator 10.

Figure 5:
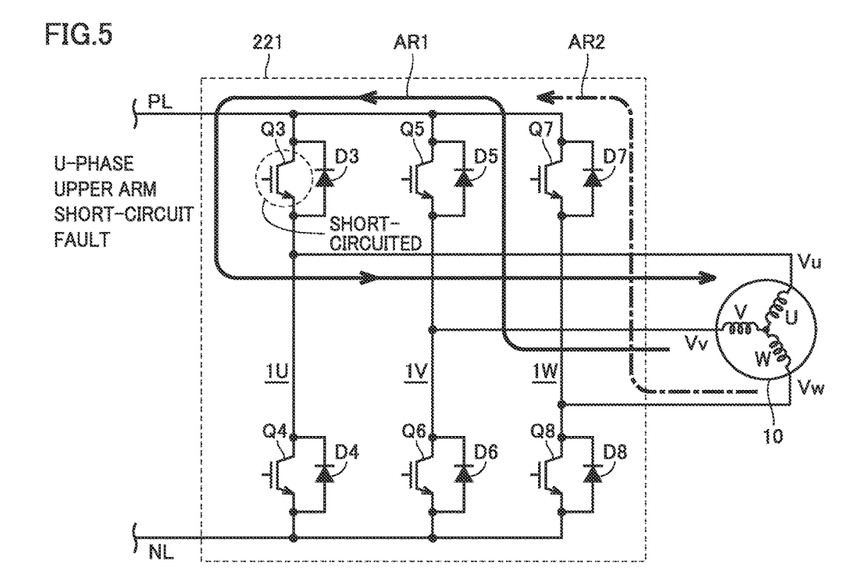
FIG. 5 is a diagram illustrating a problem when a short-circuit fault has occurred in an inverter which drives a first motor generator.

FIG. 5 is a diagram illustrating a problem when a short-circuit fault has occurred in inverter 221. Since the problem is the same when a short-circuit fault occurs in any of the three phases, FIG. 5 and FIG. 6 which will be described later representatively illustrate the case in which a short-circuit fault has occurred in switching element Q3 forming the upper arm of U-phase arm 1U.

With reference to FIG. 5, if the switching operation of the other switching elements Q4 to Q8 is continued despite the short-circuit fault occurring in switching element Q3, a short circuit occurs between power line PL and power line NL when switching element Q4 forming the lower arm of U-phase arm 1U is placed in a conducting state. This causes a large short-circuit current to flow in a direction from power line PL toward power line NL, which may result in a fault in switching element Q4 as well. To prevent this from occurring, when a short-circuit fault occurs in switching element Q3, the switching operation of the other switching elements Q4 to Q8 is stopped. Thus, even if a counter electromotive force is generated by motor generator 10 being driven to rotate in association with a limp-home run, only a current path passing through diodes D3 to D8 is formed.

For example, as indicated with an arrow AR1, the short-circuit current may flow through a path leading from the V-phase terminal to the U-phase terminal of motor generator 10 through diode D5 and switching element Q3. In addition, as indicated with an arrow AR2, the short-circuit current may flow through a path leading from the W-phase terminal to the U-phase terminal of motor generator 10 through diode D7 and switching element Q3. Therefore, a current that is the sum of the short-circuit currents indicated with arrows AR1, AR2 will flow through switching element Q3 in which the short-circuit fault has occurred.

If such a state continues for a relatively extended period of time, a continuous flow of the short-circuit current may cause excessive heat generation in the components of inverter 221 or the electric power transmission path. Specifically, each phase coil of motor generator 10, diodes D5, D7 provided on the short-circuit path, or a wire harness (not shown) electrically connecting inverter 221 to motor generator 10 or the like may be damaged by the heat generation. Therefore, it may be desirable to take appropriate measures in order to prevent the damage to these devices.

Figure 6:
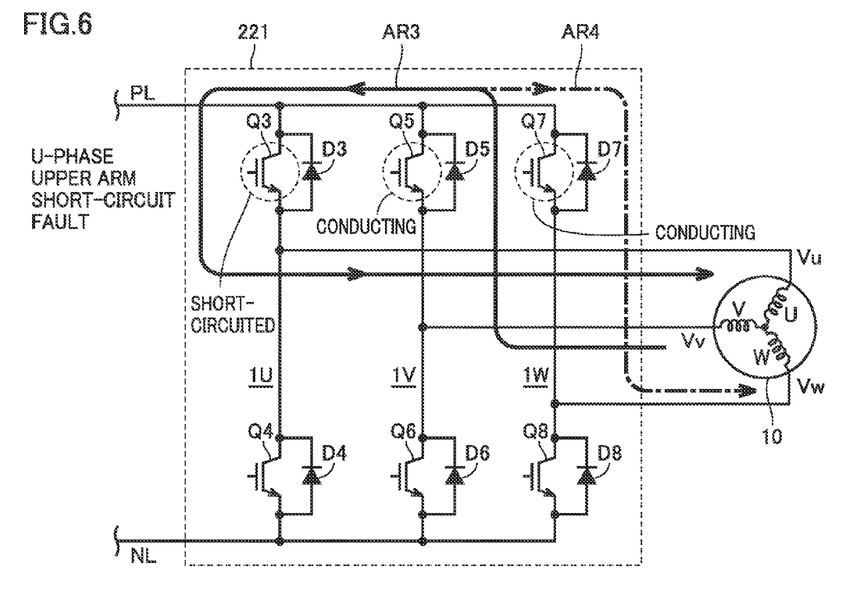
FIG. 6 is a diagram illustrating a summary of control of driving of the driving inverter in one or more embodiments.

FIG. 6 is a diagram illustrating a summary of control of driving of inverter 221. With reference to FIG. 6, when vehicle 1 runs with a short-circuit fault occurring in switching element Q3, a short-circuit current indicated with an arrow AR3 may flow, as was described with reference to FIG. 5.

In this configuration, when a short-circuit fault occurs in one of the upper arm and the lower arm of one of the three phases, the upper arms or the lower arms of the phases without the short-circuit fault are short-circuited on the same side as the arm with the short-circuit fault. That is, when one of switching elements Q3, Q5 and Q7 forming the upper arms is short-circuited, all of switching elements Q3, Q5 and Q7 forming the upper arms are switched to a conducting state. FIGS. 5 and 6 illustrate an example where switching elements Q5 and Q7 are rendered conductive because switching element Q3 has been short-circuited. Although not shown, when one of switching elements Q4, Q6 and Q8 forming the lower arms is short-circuited, on the other hand, all of switching elements Q4, Q6 and Q8 forming the lower arms are switched to a conducting state. This control will be hereinafter also referred to as "three-phase-short-circuit control."

By performing the three-phase-short-circuit control, part of the short-circuit current flowing as indicated with arrow AR3 is branched into a path leading to the W-phase terminal of motor generator 10 through switching element Q7 of the W phase, as indicated with an arrow AR4. By distributing the short-circuit current across a plurality of paths in this manner, excessive heat generation in the components of inverter 221 and the electric power transmission path can be prevented. Accordingly, a limp-home run to a nearby repair facility or safe place can be performed while damage to motor generator 10 and inverter 221 is prevented.

<Drag Torque>

When the three-phase-short-circuit control of inverter 221 is performed, a drag torque is generated in a direction which stops the rotation of motor generator 10, due to a counter electromotive force (electromagnetic action) produced when motor generator 10 is driven to rotate in association with a limp-home run of vehicle 1.

Figure 7:
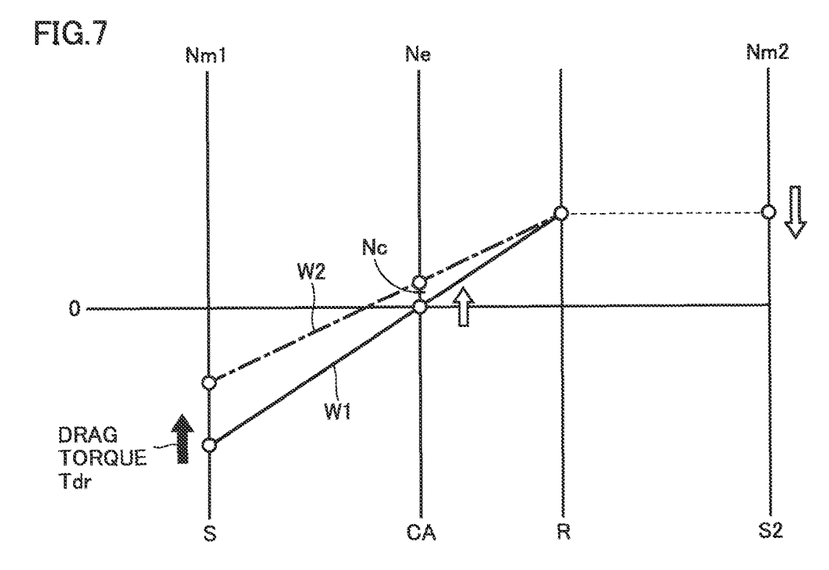
FIG. 7 is a nomographic chart illustrating the behavior of each rotary element when control is performed to create a three-phase-short-circuit state.

FIG. 7 is a nomographic chart illustrating the behavior of each rotary element when the three-phase-short-circuit control is performed. With reference to FIGS. 2 and 7, with planetary gear mechanism 30 configured as described above, rotation speed of sun gear S (=MG1 rotation speed Nm1), rotation speed of carrier CA (=engine speed Ne) and rotation speed of ring gear R (=MG2 rotation speed Nm2) have a relation connected with a straight line on the nomographic chart.

Let it be assumed that engine 100 is in a stopped state and a limp-home run (a so-called motor run) of vehicle 1 is being performed using motor generator 20. In this case, motor generator 10 rotates in a negative direction as indicated with a straight line W1. Thus, a drag torque Tdr in a positive direction (a direction toward zero) is output from motor generator 10. Thus, MG1 rotation speed Nm1 varies in a direction toward zero by the drag torque. Consequently, engine 100 is driven to rotate in a positive direction to increase engine speed Ne.

If engine speed Ne exceeds a threshold value Nc (for example, a few hundred rpm) as indicated with a straight line W2 by increasing engine speed Ne, engine 100 can be started. The starting of engine 100 improves the limp-home capability of vehicle 1. For example, the running distance or vehicle speed V can be increased.

Figure 8:
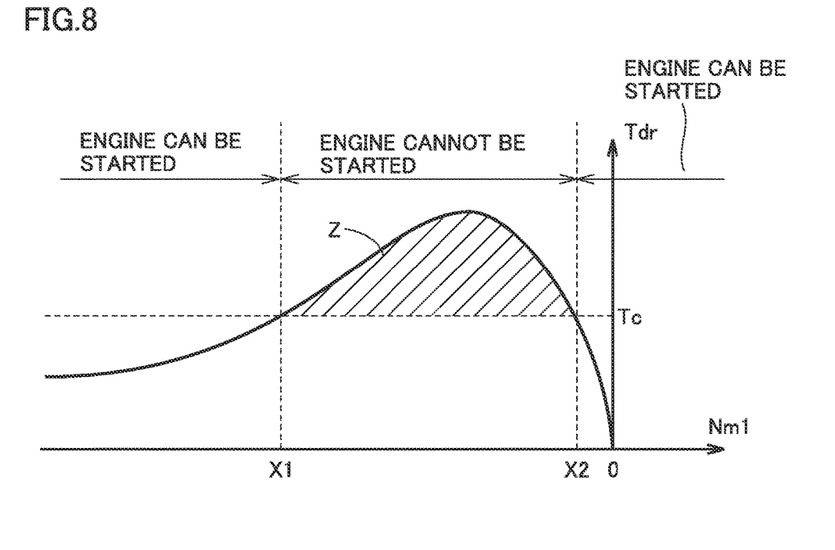
FIG. 8 is a diagram representing an example of relation between a drag torque and rotation speed of the first motor generator.

The magnitude of drag torque Tdr depends on MG1 rotation speed Nm1. FIG. 8 is a diagram representing an example of correspondence relation between drag torque Tdr and MG1 rotation speed Nm1. In FIG. 8, the horizontal axis represents MG1 rotation speed Nm1 while the vertical axis represents drag torque Tdr.

With reference to FIG. 8, as MG1 rotation speed Nm1 increases in a positive direction from a negative value, drag torque Tdr increases. When MG1 rotation speed Nm1 increases further, drag torque Tdr conversely decreases.

When sufficient drag torque Tdr has not been generated, engine speed Ne may become smaller than its desired amount. Thus, there is a limited range of MG1 rotation speed Nm1 in which engine speed Ne can be increased to threshold value Nc at which engine 100 can be started using drag torque Tdr (see FIG. 7). This range will be hereinafter referred to as a "range Z," which is indicated with diagonal lines. In order to start engine 100, MG1 rotation speed Nm1 needs to be within range Z of between X1 or more and X2 or less.

Here, the assumption is made that vehicle 1 is not provided with automatic transmission 40. In this case, MG2 rotation speed Nm2 is determined according to vehicle speed V. Since engine speed Ne is substantially zero, MG1 rotation speed Nm1 is also determined according to vehicle speed V. As a result, based on the correspondence relation shown in FIG. 8, the magnitude of drag torque Tdr is also determined according to vehicle speed V. Thus, desired drag torque Tdr (Tc in FIG. 8) may not be secured depending on vehicle speed V, resulting in inability to increase engine speed Ne appropriately. As a result, when engine 100 is in a stopped state as in this assumed example, it may be impossible to increase engine speed Ne to the speed (threshold value Nc) at which engine 100 can be started.

Therefore, some embodiments employ a configuration in which MG1 rotation speed Nm1 is controlled by performing transmission control of automatic transmission 40, thereby controlling the magnitude of drag torque Tdr. In other words, when MG1 rotation speed Nm1 is not within range Z in which engine 100 can be started by drag torque Tdr generated by the three-phase-short-circuit control, the transmission control of automatic transmission 40 is performed such that MG1 rotation speed Nm1 falls within range Z. This transmission control will be described below in detail.

Figure 9:
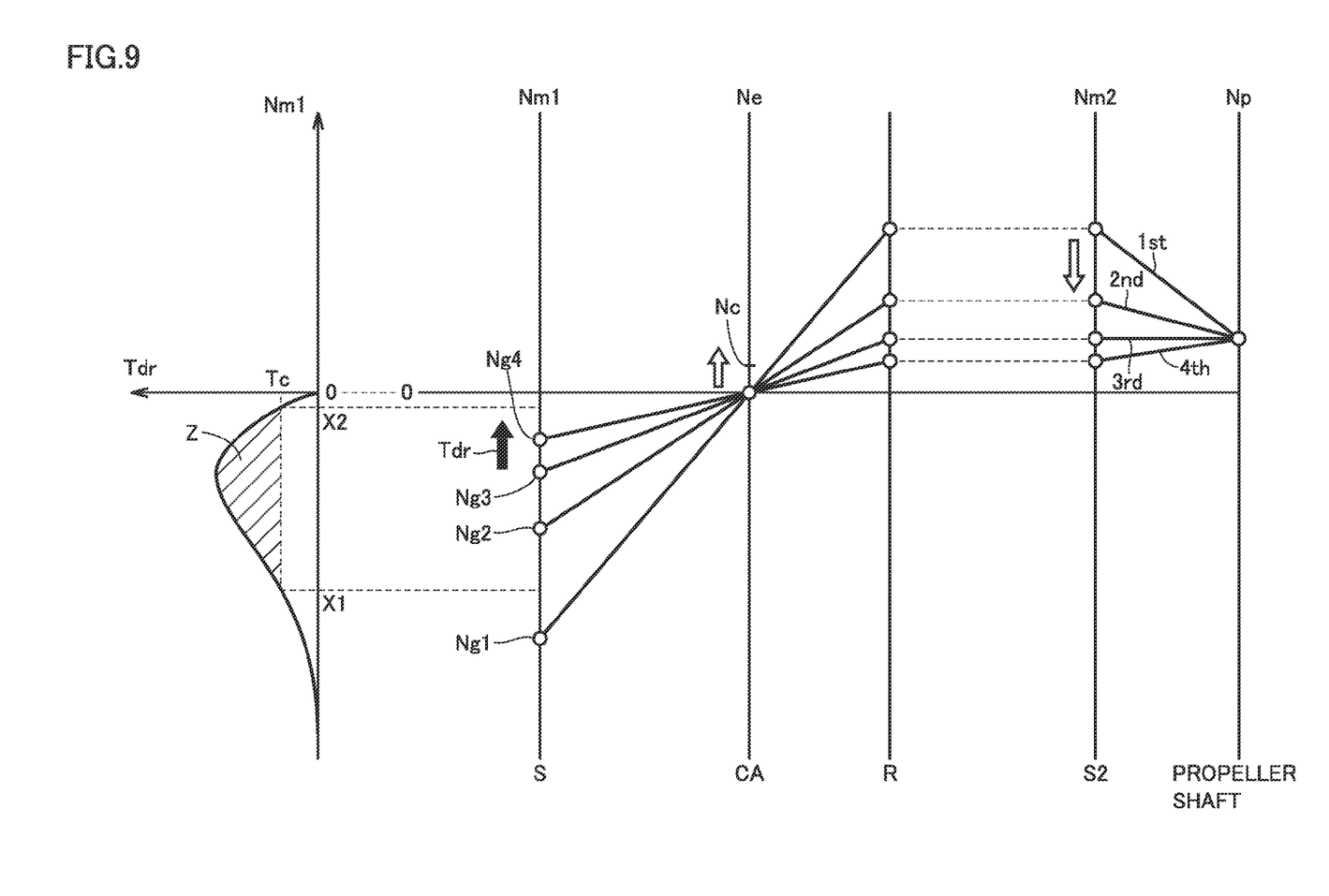
FIG. 9 is a nomographic chart illustrating transmission control of the automatic transmission in the hybrid vehicle according to one or more embodiments.

FIG. 9 is a diagram illustrating the transmission control of automatic transmission 40 in vehicle 1 according to some embodiments. In FIG. 9, a nomographic chart is shown on the right side of the figure. The diagram representing the correspondence relation between drag torque Tdr and MG1 rotation speed Nm1 (see FIG. 8) is shown on the left side of the figure.

With reference to FIGS. 1 and 9, propeller shaft rotation speed Np is determined according to vehicle speed V. In embodiments in which the automatic transmission 40 is provided between motor generator 20 and propeller shaft 60, the magnitude relation of MG2 rotation speed Nm2 to propeller shaft rotation speed Np may vary by changing the gear position of automatic transmission 40.

In the example shown in FIG. 9, the third gear position is a directly coupled position. Thus, when the third gear position is formed, MG2 rotation speed Nm2 and propeller shaft rotation speed Np become equal to each other. When the first gear position or second gear position is formed, on the other hand, MG2 rotation speed Nm2 becomes higher than propeller shaft rotation speed Np. When the fourth gear position is formed, MG2 rotation speed Nm2 becomes lower than propeller shaft rotation speed Np. As MG2 rotation speed Nm2 varies in this manner, MG1 rotation speed Nm1 also varies. That is, MG1 rotation speed Nm1 can be controlled by the transmission control of automatic transmission 40.

When the first gear position is formed in automatic transmission 40, MG1 rotation speed Nm1 reaches Ng1. Ng1 is outside of range Z in the example shown in FIG. 9. Thus, when the first gear position is formed, the magnitude of drag torque Tdr is relatively small, so that engine speed Ne cannot be increased to threshold value Nc at which engine 100 in a stopped state can be started. When the second to fourth gear positions are formed, on the other hand, MG1 rotation speed Nm1 reaches Ng2 to Ng4, respectively. All of Ng2 to Ng4 are within range Z. Thus, when the second to fourth gear positions are formed, engine speed Ne can be increased to threshold value Nc to thereby start engine 100.

In this manner, according to some embodiments, the magnitude of drag torque Tdr can be varied by controlling MG1 rotation speed Nm1 by the transmission control of automatic transmission 40. By securing desired drag torque Tdr, engine speed Ne can be increased appropriately.

In addition, when there are a plurality of gear positions at which engine 100 can be started, it is desirable to select a lower speed gear position (the second gear position in the example shown in FIG. 9). An amount of increase in engine speed Ne during execution of the three-phase-short-circuit control is not determined only by the magnitude of the drag torque. On the nomographic chart, the amount of increase in the engine speed is also determined by the magnitude of a negative torque which is output from motor generator 20 so as to receive a reaction force of drag torque Tdr, in other words, an amount of decrease in MG2 rotation speed Nm2. The lower the speed of the gear position, the higher the MG2 rotation speed Nm2, thus the more likely the amount of decrease in MG2 rotation speed Nm2 will increase, and therefore, the more likely the amount of increase in engine speed Ne will increase. Accordingly, engine 100 can be started more reliably by selecting a lower speed gear position.

Figure 10:
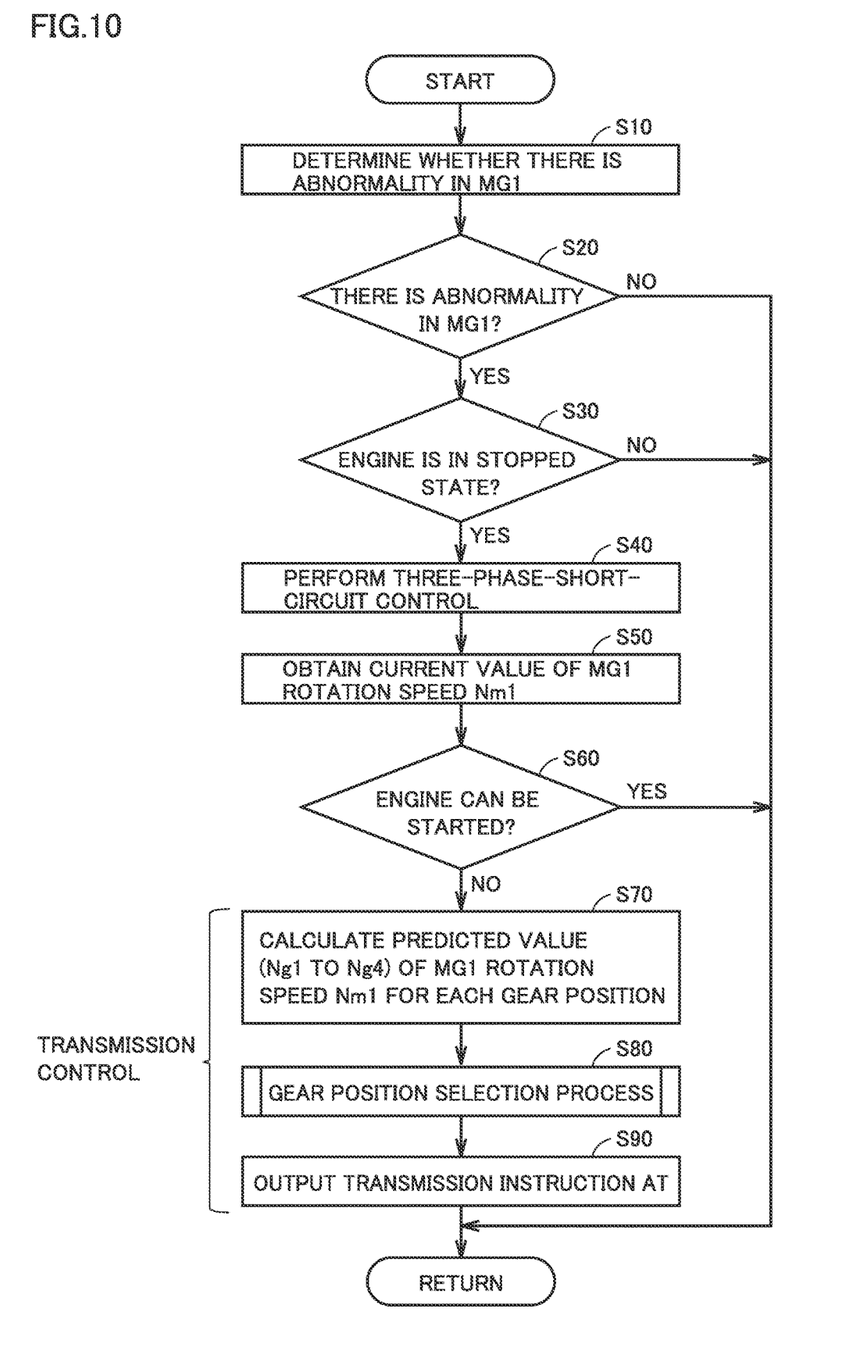
FIG. 10 is a flowchart illustrating the transmission control of the automatic transmission in the hybrid vehicle according to one or more embodiments.

FIG. 10 is a flowchart illustrating the transmission control of automatic transmission 40 in vehicle 1 according to some embodiments. This flowchart is invoked from a main routine and executed when predetermined conditions are satisfied, or at regular time intervals. Although each step (abbreviated as S hereinafter) of this flowchart is basically implemented through software processing by ECU 300, the step may be implemented through hardware processing using an electronic circuit fabricated in ECU 300.

With reference to FIGS. 1, 2, 4 and 10, in S10, ECU 300 determines whether or not there is an abnormality in motor generator 10. The abnormality in motor generator 10 as used herein collectively refers to an abnormality in the components of motor generator 10 and inverter 221, as well as in the electric power transmission path between motor generator 10 and inverter 221.

More specifically, the presence or absence of an abnormality in motor generator 10 can be determined by comparing a control pattern of switching elements Q3 to Q8 of each phase of inverter 221 with a detected pattern of motor current MCRT1 from current sensor 241. Alternatively, the determination can be made by referring to fault information about the sensors (resolver 421, voltage sensor 230, and current sensor 241) provided on motor generator 10 and inverter 221. When the control of driving of motor generator 10 for rotation cannot be performed normally, ECU 300 determines that there is an abnormality in motor generator 10. When there is no abnormality in motor generator 10 (NO in S20), ECU 300 skips the subsequent process and causes the process to return to the main routine.

When there is an abnormality in motor generator 10 (YES in S20), ECU 300 causes the process to proceed to S30 and determines whether or not engine 100 is in a stopped state. When engine speed Ne is below a prescribed value, ECU 300 determines that engine 100 is in a stopped state. When engine 100 is in a stopped state (YES in S30), ECU 300 causes the process to proceed to S40. When engine 100 is not in a stopped state (NO in S30), ECU 300 skips the subsequent process and causes the process to return to the main routine.

In S40, ECU 300 performs the three-phase-short-circuit control of inverter 221. This control was described in detail with reference to FIGS. 5 and 6, and thus description thereof will not be repeated.

In S50, ECU 300 obtains a current value of MG1 rotation speed Nm1. Furthermore, ECU 300 determines whether or not engine speed Ne can be increased to the speed (threshold value Nc) at which engine 100 can be started using drag torque Tdr corresponding to the current value of MG1 rotation speed Nm1 (S60). More specifically, the correspondence relation as shown in FIG. 8 is stored in advance as a map or relational expression in the memory (not shown) of ECU 300. ECU 300 determines whether or not the current value of MG1 rotation speed Nm1 is within range Z.

When engine speed Ne can be increased to threshold value Nc at which engine 100 can be started, that is, when the current value of MG1 rotation speed Nm1 is within range Z (YES in S60), ECU 300 determines that it is not particularly necessary to perform the transmission control of automatic transmission 40, skips the subsequent process and causes the process to return to the main routine. When engine speed Ne cannot be increased to threshold value Nc by drag torque Tdr generated by the three-phase-short-circuit control of inverter 221, that is, when the current value of MG1 rotation speed Nm1 is not within range Z (NO in S60), on the other hand, ECU 300 causes the process to proceed to S70 and performs the transmission control of automatic transmission 40.

In S70, ECU 300 calculates a predicted value (=Ng1 to Ng4) of MG1 rotation speed Nm1 for each of the first to fourth gear positions. MG1 rotation speed Nm1 at each gear position can be calculated by calculating MG2 rotation speed Nm2 from propeller shaft rotation speed Np and a transmission gear ratio at that gear position, and further by using the linear relation in the nomographic chart shown in FIG. 9.

In S80, based on the predicted value of MG1 rotation speed Nm1 at each gear position that has been calculated in S70, ECU 300 performs a process for selecting a gear position of automatic transmission 40 (gear position selection process).

In S90, ECU 300 outputs transmission instruction AT indicating the gear position that has been selected by the gear position selection process to automatic transmission 40. Accordingly, the selected gear position is formed in automatic transmission 40.

Figure 11:
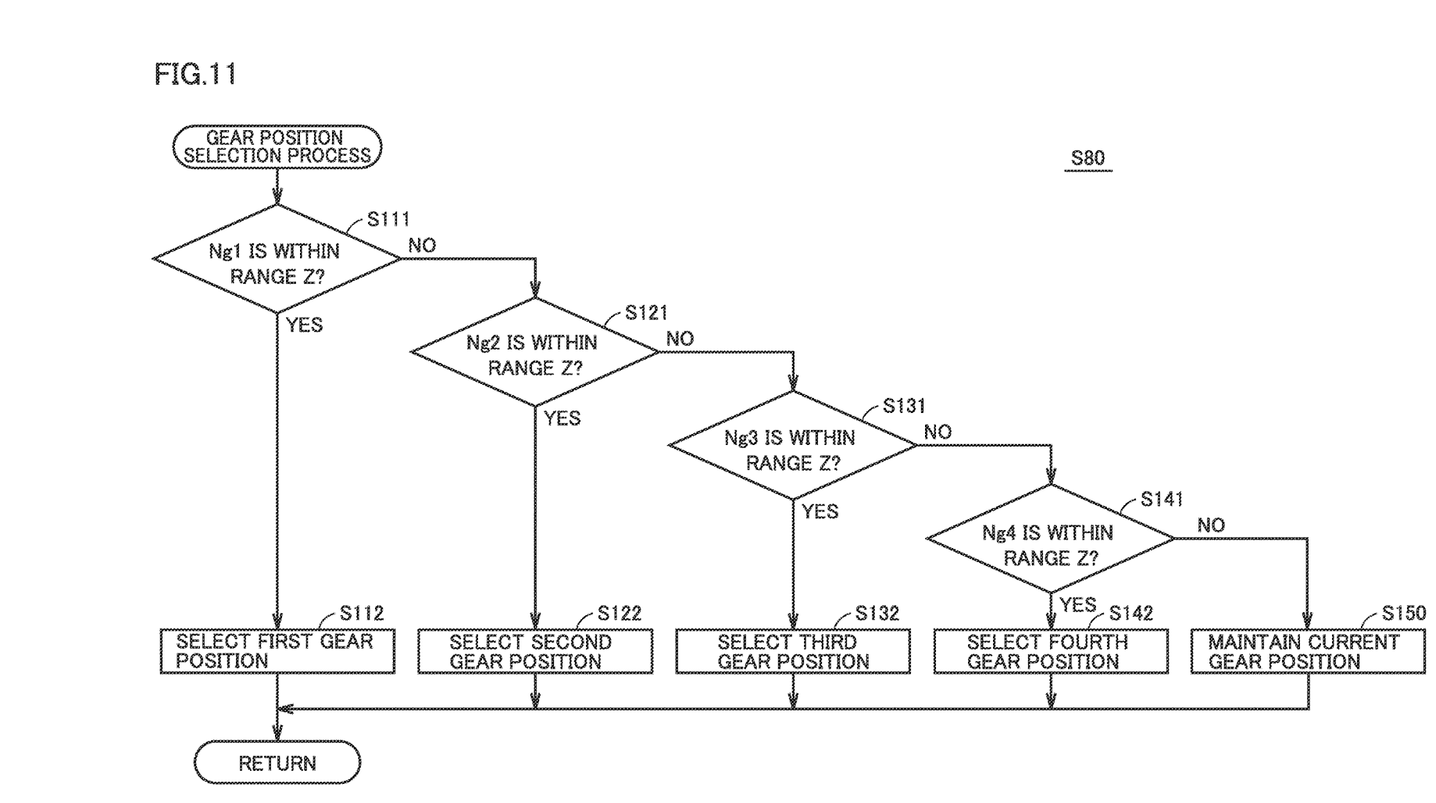
FIG. 11 is a flowchart illustrating a gear position selection process shown in FIG. 10.

FIG. 11 is a flowchart illustrating the gear position selection process (S80) shown in FIG. 10. In this gear position selection process, ECU 300 performs the transmission control of automatic transmission 40 such that MG1 rotation speed Nm1 falls within range Z, as will be described below in detail. With reference to FIGS. 1, 2, 4 and 11, in S111, ECU 300 determines whether or not predicted value Ng1 of MG1 rotation speed Nm1 at the first gear position is within range Z. When predicted value Ng1 is within range Z (YES in S111), ECU 300 selects the first gear position as a gear position after a change in gear position (S112).

When predicted value Ng1 is outside of range Z (NO in S111), ECU 300 determines whether or not predicted value Ng2 of MG1 rotation speed Nm1 at the second gear position is within range Z (S121). When predicted value Ng2 is within range Z (YES in S121), ECU 300 selects the second gear position as a gear position after a change in gear position (S122).

Subsequently, in a manner similar to that of the first gear position, when predicted value Ng2 of MG1 rotation speed Nm1 at the second gear position is outside of range Z (NO in S121), ECU 300 determines whether or not predicted value Ng3 of MG1 rotation speed Nm1 at the third gear position is within range Z (S131). When predicted value Ng3 is within range Z (YES in S131), ECU 300 selects the third gear position as a gear position after a change in gear position (S132).

When predicted value Ng3 is outside of range Z (NO in S131), ECU 300 determines whether or not predicted value Ng4 of MG1 rotation speed Nm1 at the fourth gear position is within range Z (S141). When predicted value Ng4 is within range Z (YES in S141), ECU 300 selects the fourth gear position as a gear position after a change in gear position (S142).

When predicted value Ng4 is outside of range Z (NO in S141), ECU 300 determines that engine speed Ne cannot be increased, by forming any of the gear positions, to threshold value Nc at which engine 100 can be started, and maintains the current gear position (S150). When any one of the processes in S112, S122, S132, S142 and S150 ends, the process is returned to the flowchart shown in FIG. 10.

As described above, in some embodiments, when the three-phase-short-circuit control of inverter 221 which drives motor generator 10 is performed, MG2 rotation speed Nm2 and MG1 rotation speed Nm1 can be varied by performing the transmission control of automatic transmission 40. Thus, desired drag torque Tdr can be generated by motor generator 10, thus allowing engine speed Ne to be increased appropriately.

While the embodiments describe a situation where engine 100 in a stopped state is started by the transmission control of automatic transmission 40 by way of example, it is not required for engine 100 to be in a stopped state during execution of this transmission control. If MG1 rotation speed Nm1 is negative during a motor run, engine speed Ne can be increased by the transmission control of automatic transmission 40, even if engine 100 is in a driven state.

In addition, while it has been explained in the flowchart shown in FIG. 10 that the transmission control of automatic transmission 40 is performed when engine speed Ne cannot be increased to threshold value Nc at which engine 100 can be started by drag torque Tdr generated by the three-phase-short-circuit control of inverter 221 (see S50, S60), the processes in S50, S60 are not a requirement. The transmission control of automatic transmission 40 may be performed regardless of the current value of MG1 rotation speed Nm1.

Moreover, while the flowchart shown in FIG. 11 has described an example where it is determined whether or not the predicted value is equal to or greater than the required value for all the gear positions of automatic transmission 40, the determination may be made only for some predetermined gear positions (two or more gear positions).

The embodiments disclosed herein are illustrative and non-restrictive in every respect. The scope of the claimed subject matter is defined by the terms of the claims, and is intended to include any modifications within the scope and meaning equivalent to the terms of the claims.

What is claimed is:

1. A hybrid vehicle comprising:
   an engine;
   a first rotating electric machine including a three-phase AC motor;
   a second rotating electric machine configured to output motive power to a drive shaft;
   a planetary gear mechanism including a sun gear coupled to the first rotating electric machine, a ring gear coupled to the second rotating electric machine, and a carrier coupled to the engine;
   an inverter including drive arms of three phases each having an upper arm and a lower arm, the inverter being configured to drive the first rotating electric machine;
   a transmission including a plurality of gear positions, and coupled between the second rotating electric machine and the drive shaft; and
   a controller configured to control the inverter and the transmission,
   the controller being configured to
      when the engine is stopped and a short-circuit fault occurs in one of the upper arm and the lower arm of one phase of the drive arms of three phases, perform three-phase-short-circuit control in which the upper arms or the lower arms of the phases without the short-circuit fault are short-circuited, on the same side as the upper arm or the lower arm with the short-circuit fault, and
      when rotation speed of the first rotating electric machine is not within a specific range in which the engine can be started by a torque generated by the three-phase-short-circuit control, perform transmission control of the transmission such that the rotation speed of the first rotating electric machine falls within the specific range.

2. The hybrid vehicle according to claim 1, wherein when performing the transmission control, the controller is configured to
   calculate a predicted value of the rotation speed of the first rotating electric machine for each of two or more gear positions of the plurality of gear positions, the value predicted when switching is made to the gear position, and
   select a lower speed gear position of the gear positions at which the predicted values are within the specific range.

* * * * *